United States Patent
Bowers et al.

(10) Patent No.: US 6,182,525 B1
(45) Date of Patent: Feb. 6, 2001

(54) MOVABLE VEHICLE PEDAL APPARATUS

(75) Inventors: Paul A. Bowers, Ray; Daniel R. Sutherland, Eastpointe, both of MI (US)

(73) Assignee: TRW Vehicle Safety Systems Inc., Lyndhurst, OH (US)

( * ) Notice: Under 35 U.S.C. 154(b), the term of this patent shall be extended for 0 days.

(21) Appl. No.: 09/258,108

(22) Filed: Feb. 25, 1999

(51) Int. Cl.⁷ ............................ G05G 1/14; B60K 28/14
(52) U.S. Cl. ................................. 74/512; 180/274
(58) Field of Search .............. 74/512, 560, 513; 180/274, 275

(56) References Cited

U.S. PATENT DOCUMENTS

| | | | |
|---|---|---|---|
| 5,172,606 | * 12/1992 | Dzioba et al. | 74/560 X |
| 5,519,997 | * 5/1996 | Specht . | |
| 5,531,135 | 7/1996 | Dolla . | |
| 5,632,184 | 5/1997 | Callicutt et al. . | |
| 5,676,397 | 10/1997 | Bauer . | |
| 5,873,599 | * 2/1999 | Bauer et al. . | |

FOREIGN PATENT DOCUMENTS

| | | | |
|---|---|---|---|
| 4409324 | * 10/1994 | (DE) . | |
| WO9960457 | 11/1999 | (WO) . | |

* cited by examiner

*Primary Examiner*—Mary Ann Green
(74) *Attorney, Agent, or Firm*—Tarolli, Sundheim, Covell, Tummino & Szabo L.L.P.

(57) ABSTRACT

An apparatus (12) for helping to reduce injury to a lower extremity (18, 20) of a driver of a vehicle (10) in the event of a vehicle collision. The apparatus (12) comprises one or more pedals (40, 42, 44) having an operative condition in which the pedals are engageable by a foot (20) of the driver to control a vehicle operation. The pedals (40, 42, 44) have an inoperative condition in which the pedals are not engageable by the driver's foot (20) to control a vehicle operation. A mechanism (50, 52, 54) moves the pedals (40, 42, 44) from the operative condition to the inoperative condition in the event of a vehicle collision.

5 Claims, 3 Drawing Sheets

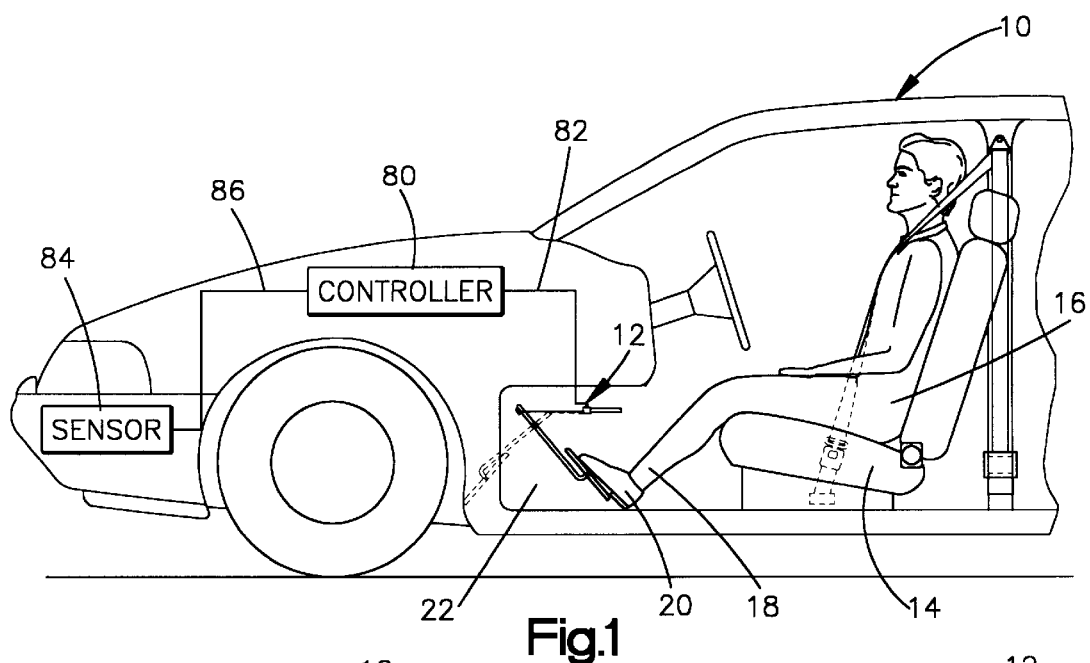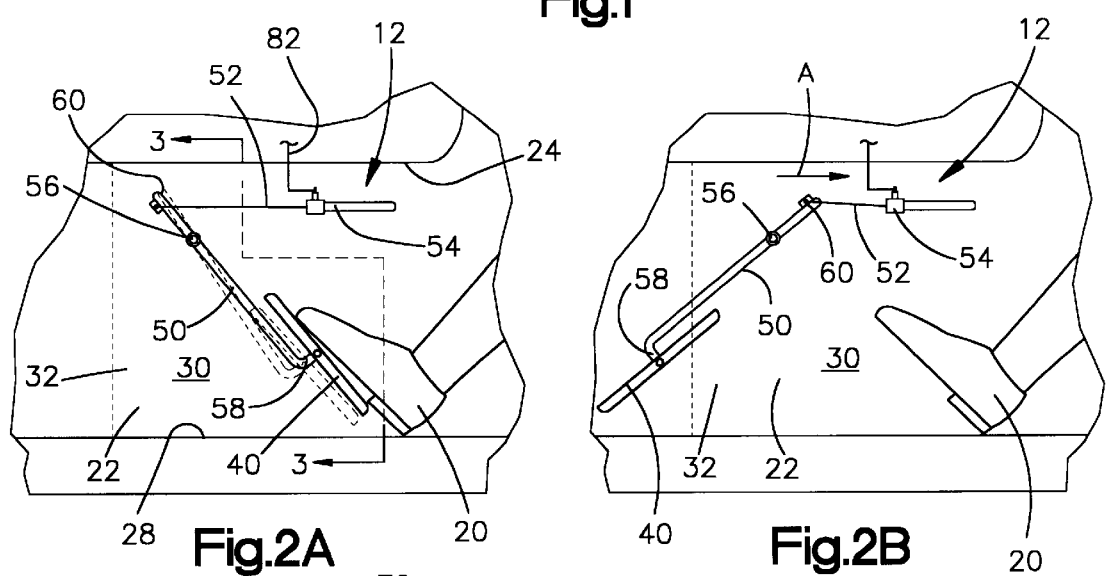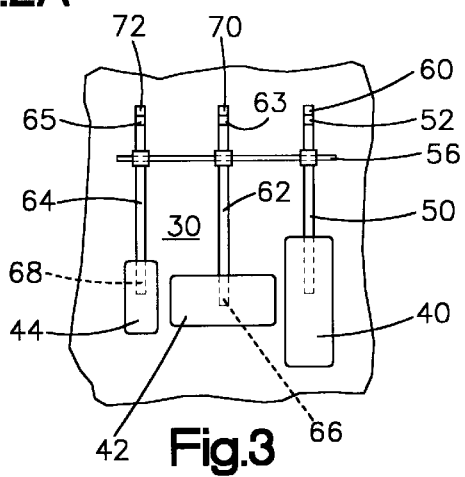

MOVABLE VEHICLE PEDAL APPARATUS

TECHNICAL FIELD

The present invention is directed to a movable vehicle pedal apparatus for helping to reduce injury to a lower extremity of a vehicle driver in the event of a vehicle collision.

BACKGROUND OF THE INVENTION

A vehicle driver uses one or more pedals located in the middle of the footwell on the driver's side of the vehicle to control the operation of various vehicle components, such as the vehicle motor, the vehicle brakes, and, in the case of a vehicle having a manual transmission, the vehicle clutch. It is known to provide an adjustment mechanism to allow for positional adjustment of the pedals within the footwell.

In the event of a vehicle collision, it is possible for a lower extremity of the vehicle driver to be injured due to contact with one or more of the pedals located in the footwell. Therefore, an apparatus which moves the pedals out of the middle of the footwell in the event of a vehicle collision is desirable.

SUMMARY OF THE INVENTION

The present invention is an apparatus for helping to reduce injury to a lower extremity of a driver of a vehicle in the event of a vehicle collision. The apparatus comprises at least one pedal having an operative condition in which the at least one pedal is engageable by a foot of the driver to control a vehicle operation. The at least one pedal has an inoperative condition in which the at least one pedal is not engageable by the driver's foot to control a vehicle operation. Means are provided for moving the at least one pedal from the operative condition to the inoperative condition in the event of a vehicle collision.

BRIEF DESCRIPTION OF THE DRAWINGS

The foregoing and other features of the present invention will become apparent to those skilled in the art to which the present invention relates upon reading the following description with reference to the accompanying drawings, wherein:

FIG. 1 is a schematic side view of a vehicle having a movable pedal apparatus constructed in accordance with the present invention;

FIG. 2A is an enlarged view of a portion of FIG. 1 with the movable pedal apparatus being shown in a first condition;

FIG. 2B is a view similar to FIG. 2A showing the movable pedal apparatus in a second condition;

FIG. 3 is a view taken along line 3—3 in FIG. 2A;

DESCRIPTION OF PREFERRED EMBODIMENTS

Figure 4A:
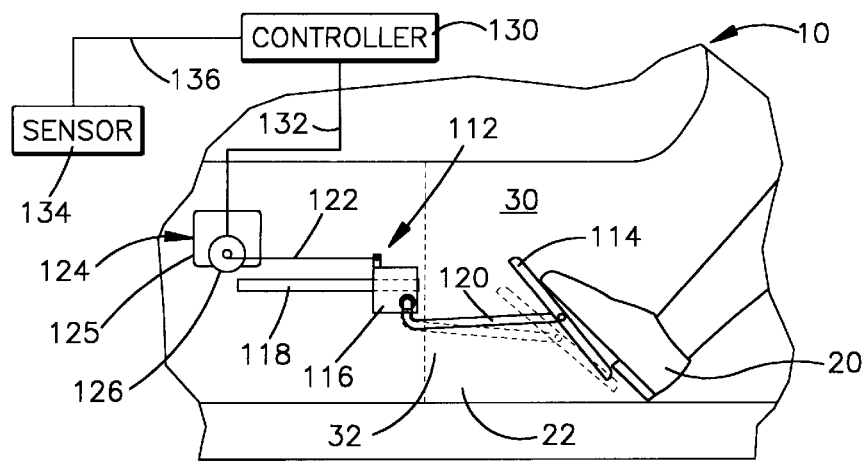
FIG. 4A is an enlarged side view illustrating a second embodiment of a movable pedal apparatus, the movable pedal apparatus being shown in a first condition.

The present invention is directed to a movable vehicle pedal apparatus for helping to reduce injury to a lower extremity of a vehicle driver in the event of a vehicle collision. As representative of the present invention, FIG. 1 illustrates a vehicle 10 having a movable pedal apparatus 12. The vehicle 10 includes a vehicle seat 14 in which a vehicle driver 16, having lower legs 18 and feet 20, is seated.

The vehicle 10 further includes a footwell 22 into which the lower legs 18 and the feet 20 of the vehicle driver 16 extend. The footwell 22 of the vehicle 10 is generally defined by a plurality of surfaces in the vehicle (see FIG. 2A) including an upper surface 24 and a lower surface 28. The footwell 22 includes a centrally located first portion 30 (FIG. 2A) in which components, described in detail below, of the movable pedal apparatus 12 are engageable by the feet 20 of the driver 16 to control a vehicle operation. The footwell 22 has a second portion 32 located about the periphery of the footwell. In the second portion 32, the components (described below) of the movable pedal apparatus 12 are not engageable by the driver's feet 20 to control a vehicle operation.

The movable pedal apparatus 12 shown in FIGS. 1–3 comprises a first pedal 40, a second pedal 42 (FIG. 3) and a third pedal 44. The first pedal 40 is an accelerator pedal operatively coupled with the vehicle motor (not shown) in a known manner (not shown) for controlling the operation of the vehicle motor. The second pedal 42 is a brake pedal operatively coupled with the vehicle brakes (not shown) in a known manner (not shown) for controlling the operation of the vehicle brakes. The third pedal 44 is a clutch pedal operatively coupled with the vehicle clutch (not shown) in a known manner (not shown) for controlling the operation of the vehicle clutch. For clarity, only the first pedal 40 is shown in FIGS. 2A and 2B. It should be understood that the movable pedal apparatus 12 could alternatively include only the accelerator pedal and the brake pedal if the vehicle 10 had an automatic transmission and thus did not require a clutch pedal.

The movable pedal apparatus 12 includes a pivotable first link 50, a first cable member 52, and an actuatable pyrotechnic device 54. The first link 50 is pivotable about a pivot bar 56 and has a lower end 58 (as viewed in the Figures) attached to the first pedal 40. The first cable member 52 extends between an upper end 60 (as viewed in the Figures) of the first link 50 and the pyrotechnic device 54. The actuatable pyrotechnic device 54 is similar to known pyrotechnic devices which are used to pretension seat belt webbing in the event of a vehicle collision. A pyrotechnic charge (not shown) inside the pyrotechnic 54 device is ignitable to generate a force which acts on the first cable member 52.

The movable pedal apparatus 12 further includes a pivotable second link 62 (FIG. 3), a second cable member 63, a pivotable third link 64, and a third cable member 65. The second and third links 62 and 64 are also pivotable about the pivot bar 56. A lower end 66 of the second link 62 is attached to the second pedal 42. Similarly, a lower end 68 of the third link 64 is attached to the third pedal 44. The second cable member 63 extends between an upper end 70 of the second link 62 and the actuatable pyrotechnic device 54. The third cable member 65 extends between an upper end 72 of the third link 64 and the actuatable pyrotechnic device 54.

The actuatable pyrotechnic device 54 is electrically connected with an electronic controller 80 by an electrical lead 82. The electronic controller 80 is operatively coupled with at least one collision sensor 84 mounted in the vehicle 10. An electrical lead 86 carries electrical signals from the collision sensor 84 to the electronic controller 80.

Under normal driving conditions, the pedals 40, 42, 44 lie in an operative condition in the first portion 30 of the footwell 22 where the pedals are engageable by the feet 20 of the vehicle driver 16 (see FIGS. 2A and 3). The pivotal connection of the links 50, 62, 64 to the pivot bar 56 permits each pedal 40, 42, 44 to move when depressed by the driver's feet 20, as shown by the dashed lines in FIG. 2A, in order to control a vehicle operation. Such movement of each of the pedals 40, 42, 44 may result in some slack in the respective cable member 52, 63, 65 with which it is associated.

Upon the occurrence of vehicle conditions indicative of an impending vehicle collision, the collision sensor 84 senses the impending collision and sends an output signal to the electronic controller 80 via the electrical lead 86. The controller 80 receives the output signal and, in response, provides a corresponding electrical signal to the pyrotechnic device 54 via the electrical lead 82. The electrical signal from the controller 80 actuates the pyrotechnic device 54. The actuation of the pyrotechnic device 54 creates a force which acts on the cable members 52, 63, 65. The cable members 52, 63 65 are pulled by the force generated by the actuation of the pyrotechnic device 54 in the direction of arrow A in FIG. 2B. This pulling of the cable members 52, 63, 65 also pulls the respective upper end 60, 70, and 72 of each of the links 50, 62 and 64, respectively, in the direction of arrow A and thereby causes each of the links to pivot about the pivot bar 56. The pivotal movement of the first link 50 moves the first pedal 40 attached to the lower end 58 of the first link to an inoperative condition, shown in FIG. 2B, in which the first pedal 40 is located in the second portion 32 of the footwell 22 where the first pedal is not engageable by the driver's foot 20 to control a vehicle operation.

Similarly, pivotal movement of the second and third links 62 and 64 moves the second and third pedals 42 and 44, respectively, into an inoperative condition identical to that which is shown in FIG. 2B for the first pedal 40. By moving the pedals 40, 42, 44 into the second portion 32 of the footwell 22 in the event of a vehicle collision, the movable pedal apparatus 12 according to the present invention helps to reduce injuries to the lower legs 18 and feet 20 of the vehicle driver which could occur as a result of contact with the pedals during the collision.

Figure 4B:
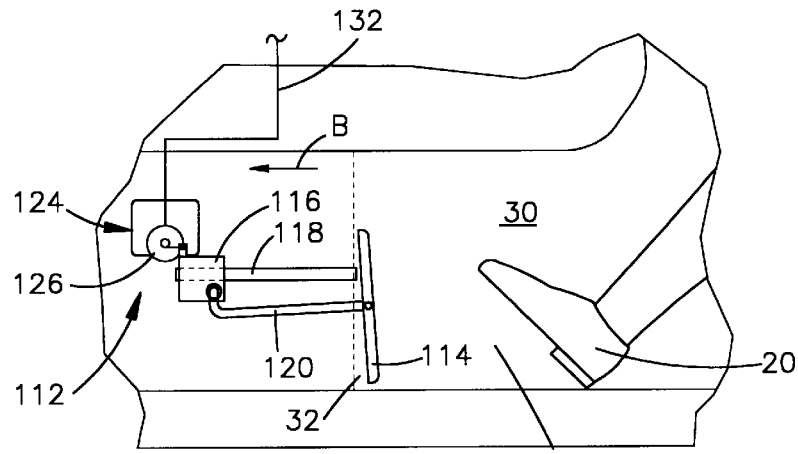
FIG. 4B is a view similar to FIG. 4A showing the movable pedal apparatus according to the second embodiment in a second condition.

FIGS. 4A and 4B illustrate a movable pedal apparatus 112 constructed in accordance a second embodiment of with the present invention. As with the previous embodiment, the movable pedal apparatus 112 preferably comprises three pedals, but could alternatively comprise two pedals. However, only a single pedal 114 is visible in the Figures and described in detail below.

The movable pedal apparatus 112 includes a slidable guide member 116 supported for movement on a guide rail 118 which is mounted to the vehicle 10. A link 120 connects the pedal 114 to the guide member 116. A retractable cable member 122 extends between the guide member 116 and an electromechanical device 124. The electromechanical device 124 preferably comprises a solenoid-actuated electric motor 125. The electromechanical device 124, when energized, is operable to retract the cable member 122 by winding up the cable member about a spool 126 attached to the electric motor 125.

The electromechanical device 124 is electrically connected with an electronic controller 130 by an electrical wire 132. The electronic controller 130 is operatively coupled with at least one collision sensor 134 mounted in the vehicle 10. An electrical lead 136 carries electrical signals from the collision sensor 134 to the electronic controller 130.

Under normal driving conditions, the pedal 114 is located in an operative condition in the first portion 30 of the footwell 22 in the vehicle 10 where it is engageable by a driver's foot 20 (see FIG. 4A). When one of the driver's feet 20 engages and depresses the pedal 114 to control a vehicle operation, the pedal pivots about its connection to the link 120. Further, depression of the pedal 114 causes the guide member 116 to slide on the guide rail 118, thereby allowing linear movement of the link 120 and the pedal 114 toward the front of the vehicle 10, as shown by the dashed lines in FIG. 4A. Such movement of the link 120 and the pedal 114 may result in some slack in the cable member 122 which is connected to the guide member 116.

Upon the occurrence of vehicle conditions indicative of an impending vehicle collision, the collision sensor 134 senses the impending collision and sends an output signal to the electronic controller 130 via the electrical lead 136. The controller 130 receives the output signal and, in response, provides a corresponding electrical signal to the electromechanical device 124 via the electrical lead 132. The electrical signal from the controller 130 energizes the electromechanical device 124. When energized, the electromechanical device 124 exerts a force on the cable member 122 which retracts the cable member in the direction of arrow B in FIG. 4B by winding the cable member onto the spool 126. As the cable member 122 is pulled in the direction of arrow B, the guide member 116 slides along the guide rail 118 toward the electromechanical device 124. This sliding movement of the guide member 116 moves the pedal 114 attached to the guide member by the link 120 to an inoperative condition shown in FIG. 4B. In the inoperative condition, the pedal 114 is located in the second portion 32 of the footwell 22 where the pedal is not engageable by one of the driver's feet 20 to control a vehicle operation.

In an identical manner, which is not shown, the other two pedals in the movable pedal apparatus 112 are simultaneously moved to the inoperative condition of FIG. 4B by respective guide members (not shown) and links (not shown). By moving the pedals into the second portion 32 of the footwell 22 in the event of a vehicle collision, the movable pedal apparatus 112 helps to reduce injuries to the lower legs 18 and feet 20 of the vehicle driver 16 which could occur as a result of contact with the pedals during the collision.

Figure 5A:
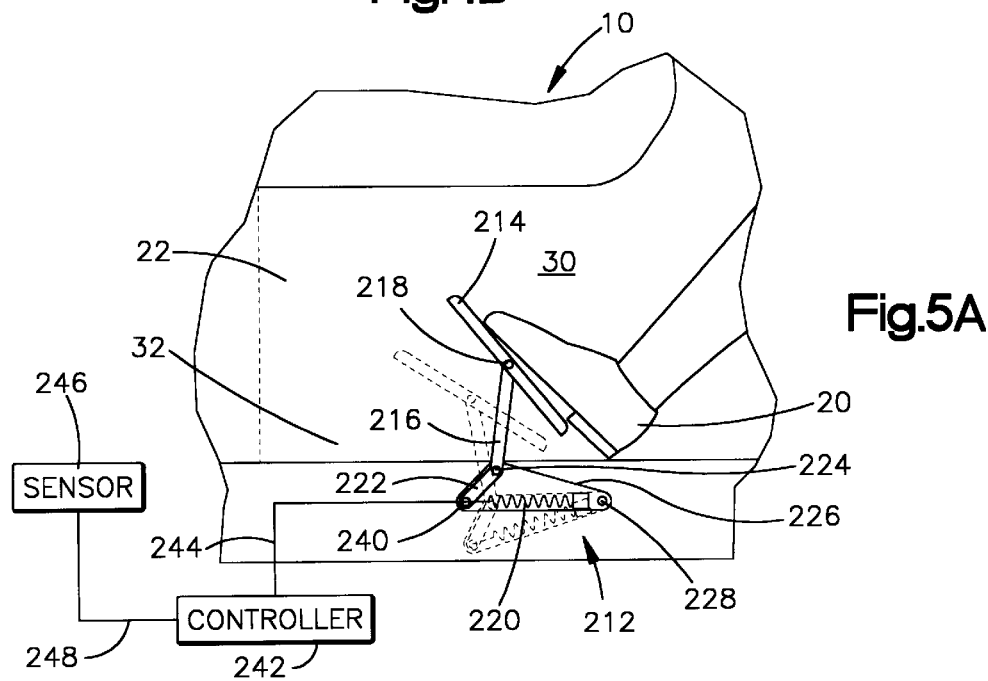
FIG. 5A is an enlarged side view illustrating a third embodiment of a movable pedal apparatus, the movable pedal apparatus being shown in a first condition.
Figure 5B:
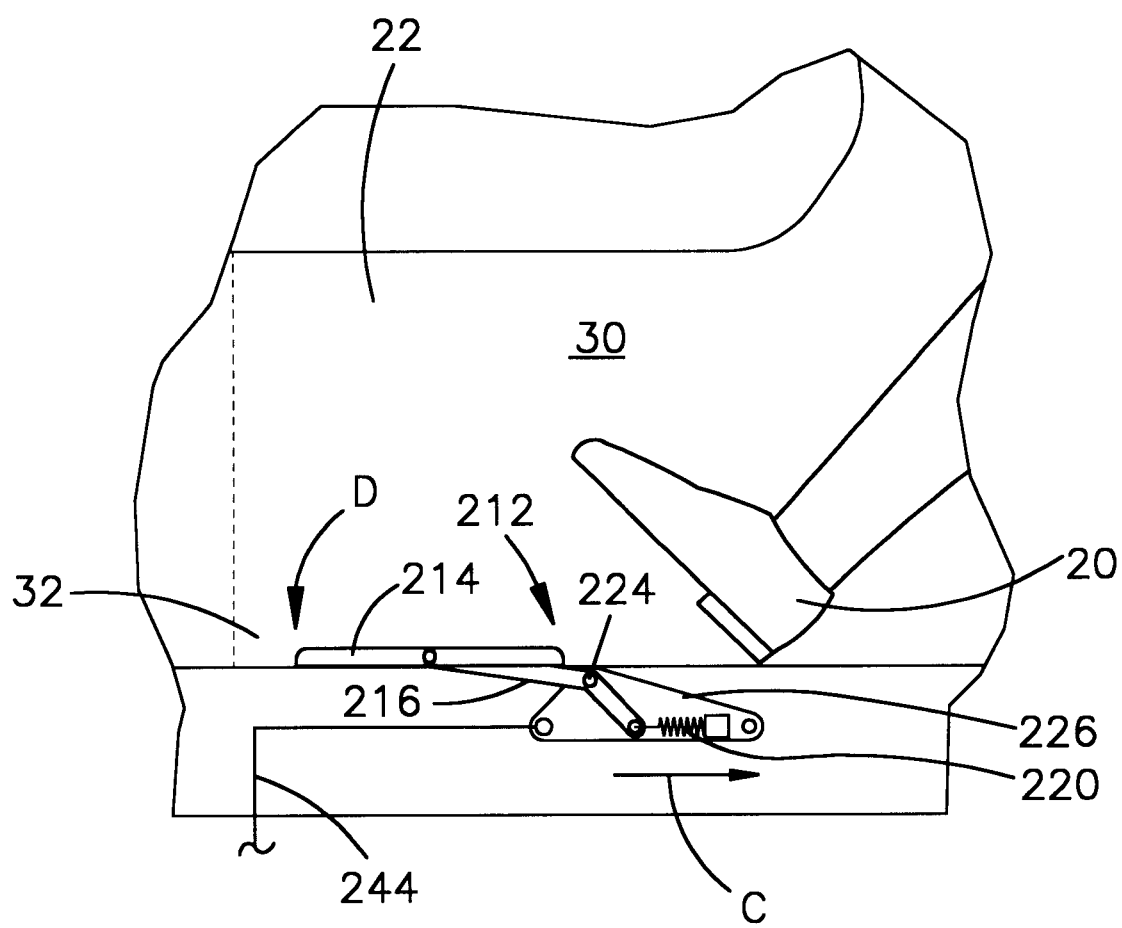
FIG. 5B is a view similar to FIG. 5A showing the movable pedal apparatus according to the third embodiment in a second condition.

FIGS. 5A and 5B illustrate a movable pedal apparatus 212 constructed in accordance with a third embodiment of the present invention. As with the previous embodiments, the movable pedal apparatus 212 preferably comprises three pedals, but could alternatively comprise two pedals. However, only a single pedal 214 is visible in the Figures and described in detail below.

The movable pedal apparatus 212 includes a pivotable link 216 having a first end 218 attached to the pedal 214. A spring 220 which is biased against extension is attached to a second end 222 of the link 216. The link 216 is pivotable about a pivot point 224 where the link is attached to a pivotable plate 226. The spring 220 is also secured to the pivotable plate 226 by a plate fastener 228. The plate 226 is pivotable about the plate fastener 228 to allow the pedal 214 to move and provide control of a vehicle operation as indicated by the dashed lines in FIG. 5A.

An explosive fastener 240 connects the second end 222 of the link 216 to the pivotable plate 226 and thereby holds the link 216 in a position which maintains the pedal 214 in an operative condition. In the operative condition of the pedal 214 (shown in FIG. 5A), the pedal is engageable by the driver's feet 20. The connection of the link 216 to the plate 226 by the explosive fastener 240 holds the spring 220 in an extended condition against the force of its bias.

The explosive fastener 240 is electrically connected with an electronic controller 242 by an electrical wire 244. The electronic controller 242 is operatively coupled with at least one collision sensor 246 mounted in the vehicle 10. An electrical lead 248 carries electrical signals from the collision sensor 246 to the electronic controller 242.

Under normal driving conditions, the pedal 214 is located in the first condition in the middle of a footwell 22 in the vehicle 10. Upon the occurrence of vehicle conditions indicative of an impending vehicle collision, the collision sensor 246 senses the impending collision and sends an output signal to the electronic controller 242 via the electrical lead 246. The controller 242 receives the output signal and, in response, provides a corresponding electrical signal to the explosive fastener 240 via the electrical lead 244.

The electrical signal from the controller 242 causes the explosive fastener 240 to explode. When the explosive fastener 240 explodes, the attachment of the link 216 to the plate 226 is terminated and the link is released for movement under the force of the bias of the spring 220. The bias of the spring 220 pulls the second end 222 of the link 216 in the direction of arrow C in FIG. 5B, causing the link to pivot about the pivot point 224. This pivotal movement of the link 216 swings the pedal 214 attached to the first end 218 of the link downward in the direction of arrow D to an inoperative condition shown in FIG. 5B. In the operative condition, the pedal is located in the second portion 32 of the footwell 22 where the pedal is not engageable by the driver's feet 20 to control a vehicle operation.

In an identical manner, which is not shown, the other two pedals in the movable pedal apparatus 212 are simultaneously moved to the inoperative condition of FIG. 5B by respective links (not shown) and springs (not shown). By moving the pedals into the second portion 32 of the footwell 22 in the event of a vehicle collision, the movable pedal apparatus 212 helps to reduce injuries to the lower legs 18 and feet 20 of the vehicle driver 16 which could occur as a result of contact with the pedals during the collision.

From the above description of the invention, those skilled in the art will perceive improvements, changes and modifications. For example, it is contemplated that individual pyrotechnic or electromechanical devices could be used for moving each pedal. Further, the linkage attached to each pedal could additionally include a manual or powered mechanism for adjusting the position of the pedals within the first portion 30 of the footwell 22 for driver comfort. Finally, it is contemplated that the movable pedal apparatuses discussed above could include a means for terminating pedal control of the respective vehicle operations upon movement of the pedals into the second portion 32 of the footwell 22. This could include a means for cutting off fuel supply to the vehicle motor. Such improvements, changes and modifications within the skill of the art are intended to be covered by the appended claims.

Having described the invention, we claim:

1. An apparatus for helping to reduce injury to a lower extremity of a driver of a vehicle in the event of a vehicle collision, said apparatus comprising:

at least one pedal having an operative condition in which said pedal is engageable by a foot of the driver to control a vehicle operation, said pedal having an inoperative condition in which said pedal is not engageable by the foot of the driver to control a vehicle operation;

means for moving said pedal from said operative condition to said inoperative condition;

at least one collision sensor for transmitting an electrical output signal in the event of an impending vehicle collision;

an electronic controller for receiving said output signal from said collision sensor and actuating said means for moving said pedal; and a pivotable link having a first end and a second end and being pivotable about a pivot axis;

said pedal being attached to said first end of said pivotable link, said means for moving said pedal being attached to said second end of said pivotable link;

upon actuation said means for moving said pedal acting upon said second end of said pivotable link to cause said first end of said pivotable link to pivot about said pivot axis and move said pedal into said inoperative condition.

2. The apparatus as in claim 1 further being defined by:

said pivot axis being located intermediate to said first end and said second end of said pivotable link.

3. The apparatus as in claim 1 further being defined by:

said means for moving said pedal comprising an actuatable pyrotechnic device, said actuatable pyrotechnic device being connected to said second end of said pivotable link by a connecting member.

4. The apparatus as in claim 3 wherein said at least one pedal comprises a first pedal and a second pedal;

said first pedal being attached to said first end of said pivotable link and said second pedal being attached to a first end of a second pivotable link;

said connecting member connecting a second end of said pivotable link to said actuatable pyrotechnic device and a second connecting member connecting a second end of said second pivotable link to said actuatable pyrotechnic device.

5. The apparatus as in claim 4 wherein said at least one pedal further comprises a third pedal;

said third pedal being attached to a first end of a third pivotable link;

a third connecting member connecting a second end of said third pivotable link to said actuatable pyrotechnic device.

* * * * *